(12) United States Patent
Reinshagen et al.

(10) Patent No.: US 10,714,713 B2
(45) Date of Patent: Jul. 14, 2020

(54) CLAMPING DEVICE FOR BATTERY CELLS AS WELL AS BATTERY MODULE, BATTERY, BATTERY SYSTEM, VEHICLE AND METHOD FOR PRODUCING A BATTERY MODULE

(71) Applicant: Robert Bosch GmbH, Stuttgart (DE)

(72) Inventors: Holger Reinshagen, Bamberg (DE); Martin Gerlach, Strullendorf (DE); Rudi Kaiser, Bamberg (DE); Silvan Poller, Neisseaue Ot Kaltwasser (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 15/506,901

(22) PCT Filed: Aug. 5, 2015

(86) PCT No.: PCT/EP2015/068058
§ 371 (c)(1),
(2) Date: Feb. 27, 2017

(87) PCT Pub. No.: WO2016/034356
PCT Pub. Date: Mar. 10, 2016

(65) Prior Publication Data
US 2017/0279088 A1 Sep. 28, 2017

(30) Foreign Application Priority Data

Sep. 1, 2014 (DE) .......................... 10 2014 217 425

(51) Int. Cl.
*H01M 2/02* (2006.01)
*H01M 2/10* (2006.01)
*H01M 6/38* (2006.01)

(52) U.S. Cl.
CPC ........... *H01M 2/0267* (2013.01); *H01M 2/10* (2013.01); *H01M 2/1016* (2013.01); *H01M 2/1077* (2013.01); *H01M 6/38* (2013.01)

(58) Field of Classification Search
CPC .... H01M 2/10; H01M 2/0267; H01M 2/1061; H01M 2/1016; H01M 2/1077
See application file for complete search history.

(56) References Cited

U.S. PATENT DOCUMENTS 3,713,895 A 1/1973 Consolloy
4,237,199 A 12/1980 Gelin
(Continued)

FOREIGN PATENT DOCUMENTS

CN 2554805 Y 6/2003
CN 103843167 A 6/2014
(Continued)

OTHER PUBLICATIONS

International Search Report for Application No. PCT/EP2015/068058 dated Feb. 29, 2016 (English Translation, 3 pages).

*Primary Examiner* — Jonathan G Jelsma
(74) *Attorney, Agent, or Firm* — Michael Best & Friedrich LLP (57) ABSTRACT

The present invention relates to a clamping device (300) for battery cells (100), characterized by: a container that comprises a space (310) with a variable volume for receiving a fluid, the container being designed such that a battery cell (100) or a plurality of battery cells (100) can be clamped. The invention also relates to a battery module, a battery, battery system, a vehicle and a method for producing a battery module (20; 30; 40; 50; 60).

20 Claims, 7 Drawing Sheets

(56) References Cited

U.S. PATENT DOCUMENTS

| | | | | |
|---|---|---|---|---|
| 6,040,085 A | * | 3/2000 | Cheu | H01M 2/0275 |
| | | | | 429/162 |
| 8,343,642 B2 | * | 1/2013 | Culver | H01M 2/1077 |
| | | | | 429/160 |
| 2002/0014055 A1 | * | 2/2002 | Iwasa | B65B 9/2028 |
| | | | | 53/551 |
| 2005/0277012 A1 | * | 12/2005 | Inagaki | H01M 8/247 |
| | | | | 429/470 |
| 2011/0262785 A1 | * | 10/2011 | Johnson | H01M 2/1077 |
| | | | | 429/66 |
| 2013/0011701 A1 | | 1/2013 | Petzinger | |
| 2013/0089765 A1 | | 4/2013 | Murayama et al. | |
| 2013/0164592 A1 | * | 6/2013 | Maguire | H01M 2/1077 |
| | | | | 429/120 |
| 2014/0038029 A1 | * | 2/2014 | Thurmeier | H01M 2/1072 |
| | | | | 429/156 |
| 2017/0098868 A1 | * | 4/2017 | Kotik | H01M 2/1077 |

FOREIGN PATENT DOCUMENTS

| | | | |
|---|---|---|---|
| DE | 102012018128 | | 3/2014 |
| DE | 102014204245 | | 9/2015 |
| EP | 1746672 | | 1/2007 |
| EP | 2273583 | A1 | 1/2011 |
| GB | 2122413 | | 1/1984 |
| JP | 58169875 | A * 10/1983 | ............ H01M 10/16 |
| WO | 2014026793 | A1 | 2/2014 |

* cited by examiner

CLAMPING DEVICE FOR BATTERY CELLS AS WELL AS BATTERY MODULE, BATTERY, BATTERY SYSTEM, VEHICLE AND METHOD FOR PRODUCING A BATTERY MODULE

BACKGROUND OF THE INVENTION

It is conceivable that greater use is being made of new battery systems (rechargeable battery systems), for example having lithium ion rechargeable batteries, lithium polymer rechargeable batteries or nickel metal hybrid rechargeable batteries, both in the case of stationary applications, for example wind turbines, and also in the case of mobile applications, for example in the case of electric vehicles (EV) or hybrid electrical vehicles (HEV) as rechargeable electrical energy storage devices (EES).

A battery system comprises a multiplicity of battery cells by way of example cylindrical or prismatic battery cells. As a result of their internal cell resistance and the electrochemical processes that are taking place, the battery cells become warm during the charging and discharging procedures. The battery cells can be connected in series in order to increase the electrical voltage and/or said battery cells can be connected in parallel in order to increase the maximum electrical current. The battery cells can be combined to form battery modules or battery units. When using said battery cells to drive vehicles, it is possible by way of example to connect approx. 100 battery cells (as a traction battery) in series or in parallel with one another.

A lithium ion battery cell comprises a positive electrode (cathode) and a negative electrode (anode) that can store in a reversible manner (intercalation) lithium ions (Li+) during the charging procedure or can discharge (deintercalation) lithium ions (Li+) during the discharging procedure. As a consequence, a periodic volume change of the electrodes occurs during the charging/discharging procedure and said change can be in the range of approx. 10% to approx. 30%. The volume change of the electrodes causes mechanical work in the electrodes and battery cells and this accelerates the aging process of the battery cells and thus shortens the serviceable life of the battery cells. Moreover, the electrodes "swell up" over the serviceable life of the battery cells, as a result of which the volume of the electrodes and the battery cells continues to increase in size over the serviceable life. Whereas cylindrical battery cells (round cells) are more or less stable owing to their winding geometry. prismatic battery cells and pouch cells should be stabilized from the outside by means of a force that counteracts the increase in volume. The force can be produced by way of example by means of clamping the battery cells in a pack frame of a battery module.

Figure 1:
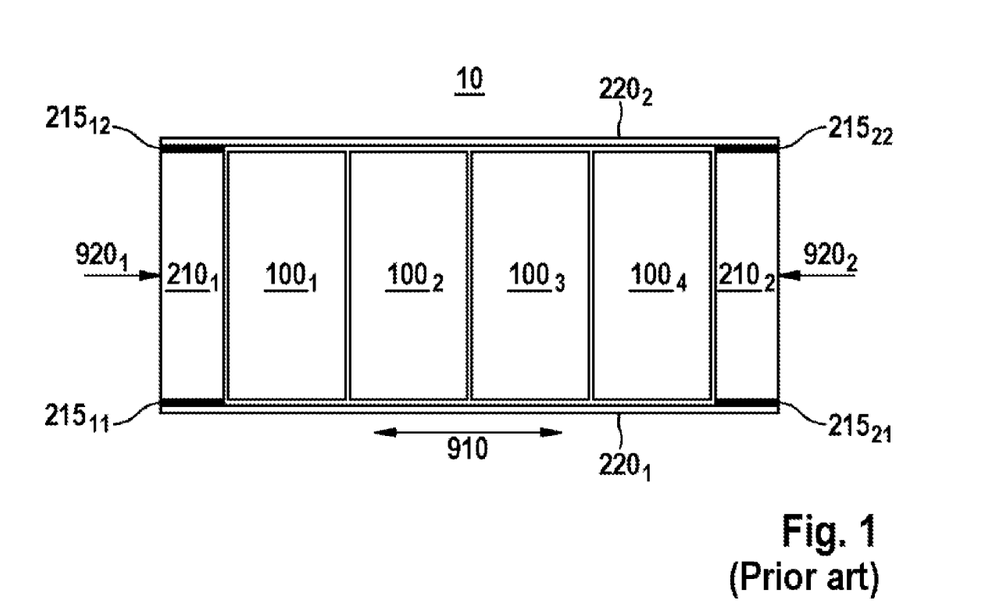
FIG. 1 illustrates a schematic view of a battery module 10 in accordance with the prior art.

FIG. 1 illustrates a schematic view of a battery module 10 in accordance with the prior art.

The battery module 10 comprises a multiplicity of prismatic battery cells $100_1 \ldots 100_4$, which are arranged adjacent to one another, and a pack frame, which comprises a first end plate $210_1$, a second end plate $210_2$, a first clamping band $220_1$ and a second clamping band $220_2$ and encompasses and clamps the multiplicity of prismatic battery cells $100_1 \ldots 100_4$. The production process of the battery module 10 can include by way of example arranging the multiplicity of battery cells $100_1 \ldots 100_4$ between the first end plate $210_1$ and the second end plate $210_2$, applying an external force to the end plates $210_1$, $210_2$, so as to join the multiplicity of battery cells $100_1 \ldots 100_4$ and fasten the clamping bands $220_1$, $220_2$ to the end plates $210_1$, $210_2$, by way of example by means of a multiplicity of weld connections $215_{11} \ldots 215_{22}$ so as to receive the force $920_1$, $920_2$, that counteracts the force of the multiplicity of joined battery cells $100_1 \ldots 100_4$.

The document DE 10 2014 204 245 that had not yet been published on the date of application of the present invention discloses an energy storage unit having a multiplicity of galvanic cells, wherein the cells in each case comprise outer contacts that are integrated in a cell housing (nutshell-cells) and the end plates comprise integrated contact plates or conductor plates.

In order to further increase the functionality and serviceable life of batteries (rechargeable batteries) and battery systems (rechargeable battery systems) and to further simplify their production process, it is however necessary to provide an improved clamping device for the battery cells.

SUMMARY OF THE INVENTION

The inventive devices and method have the advantage that the battery cells can be clamped in a simpler manner. As a consequence, it is possible to forego costly mechanical elements, constructions and/or method steps. Consequently, the number of components can be reduced and as a result the reliability increased. Furthermore, it is possible to reduce the volume and/or weight of the battery module or of the battery. Moreover, the structure of the battery module or module carrier can be more freely designed, in other words by way of example simplified and/or with a greater degree of integration. Moreover, the force for clamping the battery cells can be applied in a simple, direct and flexible manner. Furthermore, the force can be applied in an elastic manner. Consequently, it is possible to compensate for the continuous swelling of the electrodes. As a consequence, it is possible to avoid the force increasing over the serviceable life of the battery cells. Consequently, it is possible to prevent or at least reduce loss of power and safety risks of the battery cells that can be caused by an increase in the force.

In an expedient manner, the receptacle can comprise a membrane or flexible membrane. As a consequence, it is possible to avoid a relative moment of two elements with respect to one another at a contact surface. Consequently, it is possible to simplify the structure of the receptacle. Furthermore, it is possible to avoid leakage at the contact surface. Moreover, it is possible to reduce the weight of the receptacle.

In an expedient manner, the membrane can be embodied in a balloon-type, bag-type, cushion-type or drum-type manner. As a consequence, it is possible to simplify the structure of the receptacle.

In an expedient manner, the membrane can be embodied in an elastic or flexible manner. As a consequence, the membrane can be used as an energy storage device or pressure storage device.

In an expedient manner, the membrane can comprise a foil/film, synthetic material film, metallized film or metal foil or fabric. As a consequence, the production process of the receptacle can be simplified.

In an expedient manner, the membrane can be embodied in an electrically conductive manner. As a consequence, it is possible in particular in the case of nutshell-cells to provide an electrical connection of the battery cell or multiplicity of battery cells.

In an expedient manner, the membrane can comprise an electrically conductive material, aluminum (Al), copper (Cu) or carbon (C). As a consequence, it is possible to simplify the structure of the membrane.

In an expedient manner, the membrane can be embodied in an electrically non-conductive manner. As a consequence, it is possible to reduce the risk of an electrical short circuit.

In an expedient manner, the receptacle can comprise an element for carrying the membrane. As a consequence, it is possible to provide a dead volume. Consequently, it is possible to influence the elastic constant of the receptacle. Furthermore, the receptacle can provide further functionalities.

In an expedient manner, the element can comprise a metal such as aluminum or a synthetic material. As a consequence, it is possible to improve the compatibility of the material with the materials of the battery module. Consequently, it is possible to reduce the risk of corrosion.

In an expedient manner, the element can be embodied as an end plate. As a consequence, it is possible to reduce the number of components.

In an expedient manner, the receptacle can comprise a closure or a valve such as a safety valve or excess pressure valve. As a consequence, it is possible to simplify the repair, maintenance and/or overhaul procedures. Furthermore, the safety aspect can be increased.

In an expedient manner, the receptacle can comprise a seam such as an adhesive seam or weld seam. As a consequence, it is possible to simplify the production process of the receptacle.

In an expedient manner, the receptacle can contain the fluid. As a consequence, it is possible to simplify the production process of the battery module.

In an expedient manner, the fluid can be a liquid such as water ($H_2O$) or silicone oil, gas such as an inert gas by way of example nitrogen ($N_2$) or a noble gas by way of example argon (Ar) or krypton (Kr), a gel or a compressible gel. As a consequence, it is possible to adjust the fluid to suit the requirements of the respective clamping device. The receptacle can contain multiple fluids.

In an expedient manner, the fluid can be compressible. As a consequence, it is possible to use the fluid as an energy storage device or pressure storage device. As an alternative, the fluid can be non-compressible.

Furthermore, the invention provides a battery module that comprises the above described clamping device.

Furthermore, the invention provides a battery that comprises the above described clamping device or the above described battery module.

Furthermore, the invention provides a battery system that comprises the above described clamping device, the above described battery module or the above described battery.

Furthermore, the invention provides a vehicle, in particular a motor vehicle such as an electric motor vehicle, a hybrid vehicle or electric motorbike (electric bike, E-bike), electric bicycle (pedal electric cycle, pedelec), a sea vehicle such as an electric boat or submarine (U-boat), an aircraft or a spacecraft, which comprises the clamping device that is described above and is connected to the vehicle; the battery module that is described above and is connected to the vehicle; the battery that is described above and is connected to the vehicle and comprises the battery system that is described above and is connected to the vehicle.

In an expedient manner, the procedure of clamping the clamping device can comprise filling the space with the fluid and/or closing the receptacle. As a consequence, it is possible during the production process of the battery module to adjust the filling procedure to suit the requirements.

In an expedient manner, the method can include furthermore filling the space with the fluid, closing the receptacle and cooling or liquefying the fluid, wherein the procedure of clamping the clamping device includes warming the fluid or allowing the fluid to warm in the receptacle. As a consequence, it is possible to close the receptacle during the production process of the battery module. Consequently, it is possible to simplify the production process.

In an expedient manner, the method can furthermore include checking a pressure of the fluid in the receptacle and/or adjusting the pressure. As a consequence, it is possible to correct the pressure of the fluid by way of example within the scope of a repair, maintenance and/or overhaul procedure. Furthermore, it is possible to adjust the pressure of the fluid by way of example within the scope of the operation.

Consequently, it is possible to reduce the weight and/or costs, by way of example production costs relating to material costs and processing costs relating to assembly costs.

BRIEF DESCRIPTION OF THE DRAWINGS

Further features and advantages of the present invention will be evident to the person skilled in the art with reference to the attached drawings and from the description hereinunder of exemplary embodiments that are however not to be regarded as limiting the invention.

DETAILED DESCRIPTION

Figure 2:
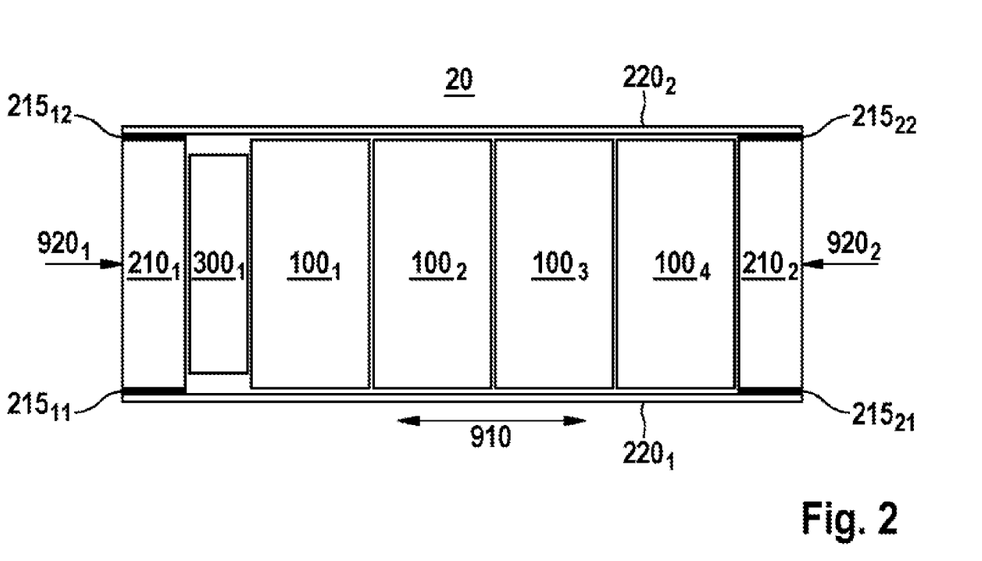
FIG. 2 illustrates a schematic plan view of a battery module 20 having a clamping device $300_1$ in accordance with an embodiment of the invention.

FIG. 2 illustrates a schematic plan view of a battery module 20 having a clamping device $300_1$ in accordance with an embodiment of the invention.

The battery module 20 comprises a multiplicity of prismatic battery cells $100_1$ . . . $100_4$, which are arranged adjacent to one another, and a packaging device, by way of example a pack frame, which comprises a first end plate $210_1$, a second end plate $210_2$, a first clamping band $220_1$ and a second clamping band $220_2$ and encompasses the multiplicity of prismatic battery cells $100_1 \ldots 100_4$. The battery cells $100_1 \ldots 100_4$ can be embodied by way of example as nutshell-cells. The clamping bands $220_1$, $220_2$ can be fastened to the end plates $210_1$, $210_2$ by way of example by means of a multiplicity of adhesive connections, riveted connections, weld connections $215_{11} \ldots 5_{22}$ such as spot welds or weld seams or screw connections.

Furthermore, the battery module 20 comprises a clamping device $300_1$ for clamping the multiplicity of battery cells $100_1 \ldots 100_4$. The clamping device $300_1$ can be arranged, as illustrated by way of example in FIG. 1, between the first end plate $210_1$ and an adjacent battery cell $100_1$ of the multiplicity of battery cells $100_1 \ldots 100_4$. The clamping device $300_1$ can where necessary be in a relaxed, by way of example folded, state. The clamping device $300_1$ can be in a tensioned, by way of example unfolded, state so that it can clamp the multiplicity of battery cells $100_1 \ldots 100_4$. The clamping device 300 can be embodied as an expander clamping device (expander). The clamping device $300_1$ or the expander can comprise a flexible receptacle that encompasses an internal space (hollow space) having a variable volume. The receptacle can comprise or be embodied as a membrane such as a flexible membrane. The membrane can be embodied by way of example in a balloon-type, bag-type, cushion-type or drum-type manner. The membrane can be embodied in an elastic or flexible manner. The receptacle or the membrane can comprise by way of example foils/films such as synthetic material films, metallized films or metal foils or fabric. The receptacle or membrane can be embodied in an electrically conductive manner so that the clamping device $300_1$ can produce an electrical connection. For this purpose, the receptacle or membrane can be coated by way of example with an electrically conductive material such as aluminum, copper or carbon. Alternatively, the receptacle or membrane can be embodied in an electrically non-conductive manner. Furthermore, the clamping device $300_1$ can comprise an element that supports the membrane.

The element can comprise by way of example a metal such as aluminum or a synthetic material. It is possible to connect one foil/film to another foil/film or to the element by way of example by means of an adhesive, by way of example by means of a liquid adhesive material or an adhesive band, or by means of welding such as laser welding, friction welding, ultrasound welding. The receptacle can be embodied in a cylindrical manner. In the tensioned state, the clamping device $300_1$ or the receptacle contains a fill medium it its internal space. The fill medium can comprise a fluid, by way of example a liquid such as water or silicone oil, a gas or inert gas such as nitrogen or a noble gas such as argon or krypton, or a gel such as a compressible gel. If the fill medium is a gas, a gas having a low coefficient of diffusion can be preferably used in order to prevent the leakage or slow down the rate of leakage of the gas by way of example through the membrane. The fill medium can be compressible or non-compressible. If the fill medium is compressible, for example if a gas is used as the fill medium, the compressed fill medium can produce the force of clamping the multiplicity of battery cells $100_1 \ldots 100_4$. If the fill medium is non-compressible, for example if a liquid is used as the fill medium, the force for clamping the multiplicity of battery cells $100_1 \ldots 100_4$ can be applied by means of a flexible membrane. Furthermore, the clamping device $300_1$ or the receptacle can comprise a non-compressible medium such as water and a compressible medium such as air. The clamping device $300_1$ or the receptacle comprises a closure. Consequently, the clamping device $300_1$ or the receptacle can be closed or sealed after being filled with the fill medium. Alternatively, the clamping device $300_1$ or the receptacle can comprise a valve such as a safety valve or excess pressure valve. Consequently, the pressure of the fill medium can be checked and/or adjusted by way of example within the scope of a repair, maintenance and/or overhaul procedure. If by way of example a part of the fill medium has escaped, a prevailing actual pressure can be increased back to its desired pressure or, if the volume of the multiplicity of battery cells $100_1 \ldots 100_4$ is increased as a result of the electrodes swelling, the actual pressure can be reduced back to the desired pressure. In a similar manner, the actual pressure during the operation of the multiplicity of battery cells $100_1 \ldots 100_4$ can be monitored and dynamically controlled. It is thus possible to increase the actual pressure during the charging procedure if the volume of the multiplicity of battery cells $100_1 \ldots 100_4$ reduces, and during the discharging procedure if the volume of the multiplicity of battery cells $100_1 \ldots 100_4$ increases it is possible to reduce the actual pressure.

The production process of the battery module 20 can include arranging or positioning the clamping device $300_1$ and the multiplicity of battery cells $100_1 \ldots 100_4$ in the packaging device, in other words between the first end plate $210_1$ and the second end plate $210_2$ and clamping or unfolding the clamping device $300_1$ for clamping the multiplicity of battery cells $100_1 \ldots 100_4$. In so doing, the clamping or unfolding procedure can be performed by way of example by means of filling the clamping device $300_1$ with the fill medium via a connection or a connection aperture. When using a gas as the fill medium, the fill pressure can be by way of example 10 bar. The connection can be permanently closed or sealed, by way of example adhered or welded, after the filling procedure. Alternatively, the connection can comprise a closure or a valve such as a safety valve or an excess pressure valve that remain in the connection after the filling procedure. Alternatively, said clamping device can be unfolded by way of example in accordance with the thermal equation of state by (re-)heating a clamping device $300_1$ to the ambient temperature, said clamping device already being filled with a gas and then rapidly cooled by way of example in liquid nitrogen.

Figure 3:
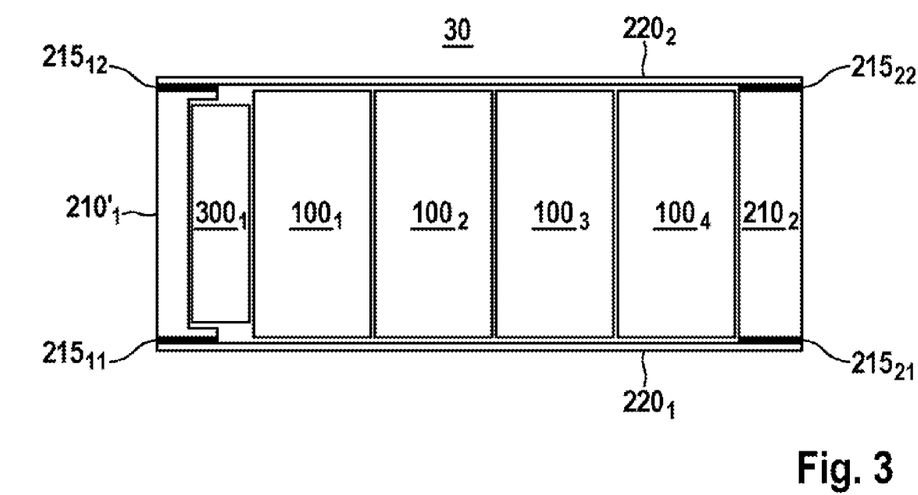
FIG. 3 illustrates a schematic plan view of a battery module 30 having a clamping device $300_1$ in accordance with another embodiment of the invention.

FIG. 3 illustrates a schematic plan view of a battery module 30 having a clamping device $300_1$ in accordance with another embodiment of the invention.

The battery module 30 is similar to the battery module 20 that is described with regard to FIG. 2, wherein the clamping device $300_1$ is integrated in the first end plate $210_1$. In general, the clamping device $300_1$ can be integrated into a device of the packaging device.

Figure 4:
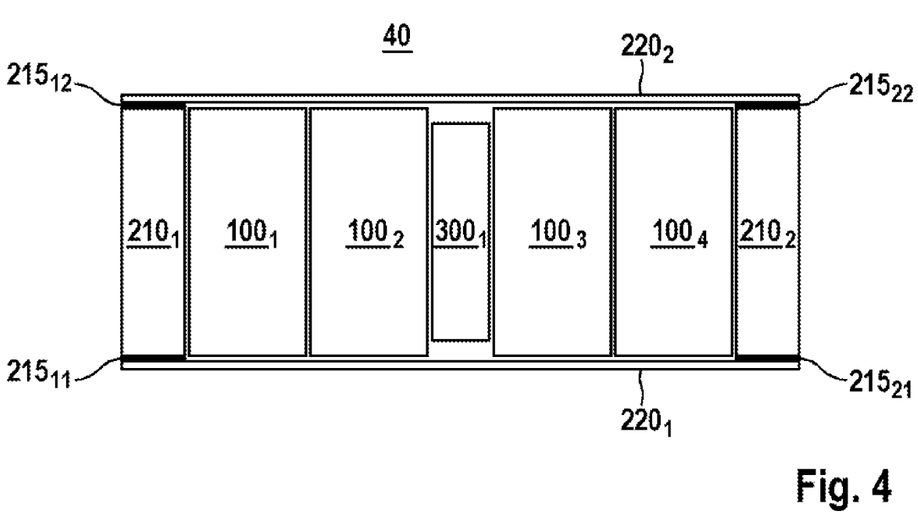
FIG. 4 illustrates a schematic plan view of a battery module 40 having a clamping device $300_1$ in accordance with a further embodiment of the invention.

FIG. 4 illustrates a schematic plan view of a battery module 40 having a clamping device $300_1$ in accordance with a further embodiment of the invention.

The battery module 40 corresponds essentially to the battery module 20 that is described with regard to FIG. 2. In the case of the battery module 40, the clamping device $300_1$, as illustrated by way of example in FIG. 4, is arranged between two battery cells $100_2$, $100_3$ of the multiplicity of battery cells $100_1 \ldots 100_4$ so that the clamping device $300_1$ is arranged essentially in the center of the battery module 40. Consequently, the clamping device $300_1$ can act in a symmetrical manner on the multiplicity of battery cells. Furthermore, the center of gravity of the battery module 40 is essentially in the center of the battery module 40. In general, the clamping device $300_1$ can be arranged between two adjacent battery cells, by way of example battery cells $100_1$, $100_2$ or battery cells $100_3$, $100_4$ of the multiplicity of battery cells $100_1 \ldots 100_4$.

Figure 5:
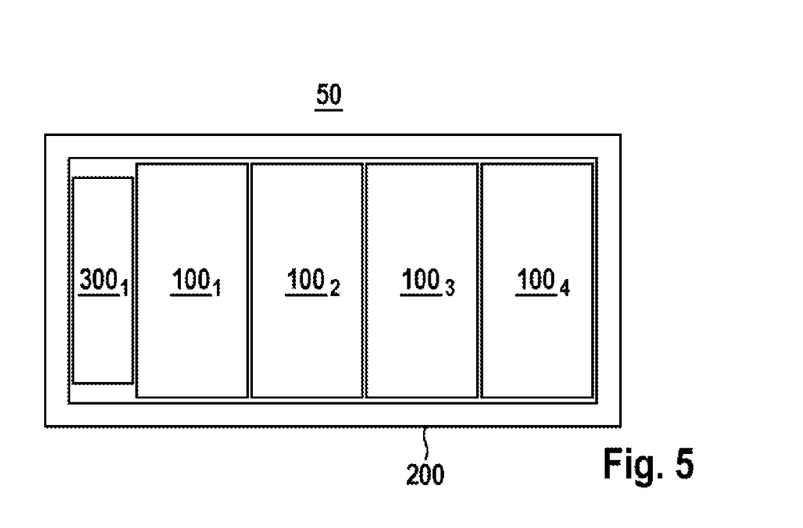
FIG. 5 illustrates a schematic plan view of another battery module 50 having a clamping device $300_1$ in accordance with a further embodiment of the invention.

FIG. 5 illustrates a schematic plan view of another battery module 50 having a clamping device $300_1$ in accordance with a further embodiment of the invention.

The battery module 50 is similar to the battery module 20 that is described with regard to FIG. 2, wherein the packaging device is embodied as a housing 200 by way of example in one piece and/or as a bath-shaped housing shell.

Figure 6:
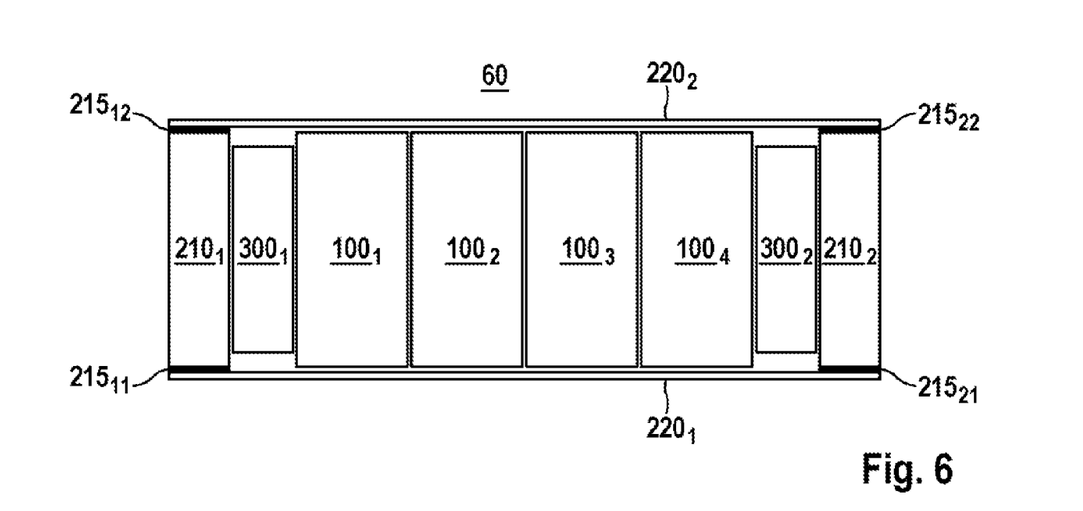
FIG. 6 illustrates a schematic plan view of a battery module 60 having two clamping devices $300_1$, $300_2$ in accordance with a further embodiment of the invention.

FIG. 6 illustrates a schematic plan view of a battery module 60 having two clamping devices $300_1$, $300_2$ in accordance with the invention a further embodiment of the invention.

The battery module 60 corresponds essentially to the battery module 20 that is described with regard to FIG. 2. Furthermore, the battery module 60 comprises a second clamping device $300_2$ that can be arranged, as illustrated by way of example in FIG. 6, between the second end plate $210_2$ and an adjacent battery cell $100_4$ of the multiplicity of battery cells $100_1 \ldots 100_4$.

FIGS. 7-15 illustrate schematic lateral sectional views of clamping devices 300 in accordance with embodiments of the invention.

Figures 7, 8, 9, 10, 11:
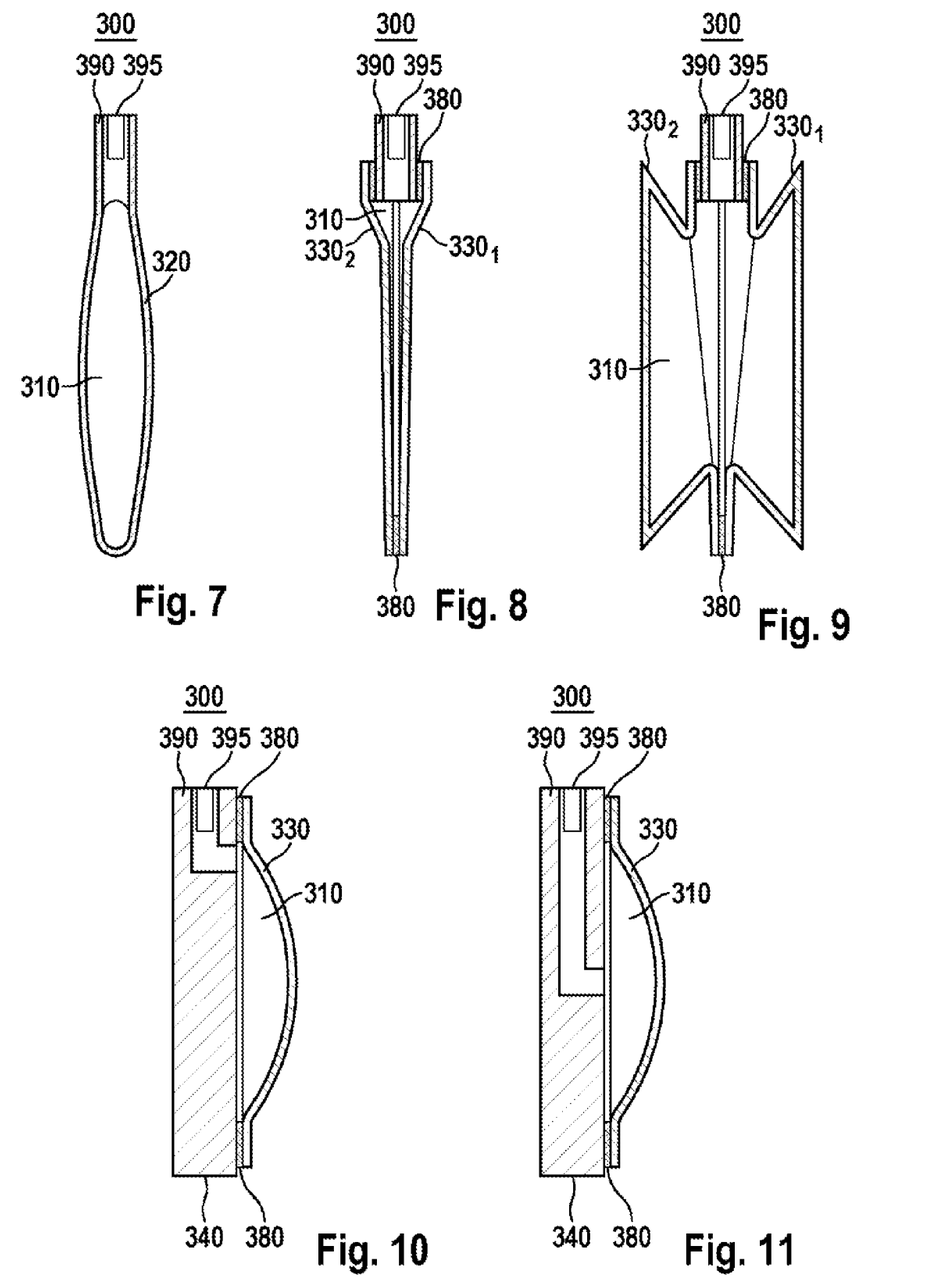
FIGS. 7-15 illustrate schematic lateral sectional views of clamping devices 300 in accordance with embodiments of the invention.

The clamping device 300 in accordance with FIG. 7 comprises a balloon-type receptacle 320 having an internal space 310 than can be filled. The receptacle 320 comprises a connection 390 that is closed with a closure or valve 395. The connection 390 can be arranged on a boundary region of the receptacle, as illustrated in FIG. 7. The balloon-type receptacle 320 can be embodied in one piece, as illustrated in FIG. 7. The balloon-type receptacle 320 can be embodied by way of example in a rectangular, such as square, or round shape.

The clamping device 300 in accordance with FIG. 8 comprises a cushion-type receptacle that comprises a first foil/film $330_1$, a second foil/film $330_2$, and a connection 390, which are connected to one another by means of seams 380 such as adhesive seams or weld seams so that an internal space 310 is formed. The connection 390 is closed by means of a closure or valve 395. The cushion-type receptacle 320 can be embodied by way of example in a rectangular, such as square, or round shape.

The clamping device 300 in accordance with FIG. 9 comprises a bag-type receptacle that comprises a first foil/film $330_1$, a second foil/film $330_2$, and a connection 390, which are connected to one another by means of seams 380 such as adhesive seams or weld seams so that an internal space 310 is formed. The first foil/film $330_1$ and the second foil/film $330_2$ can comprise folds so that the receptacle can be embodied in the form of a folded bellows or a concertina. The connection 390 is closed by means of a closure or valve 395. The bag-type receptacle can be embodied by way of example in a rectangular, such as square, or round shape.

The clamping device 300 in accordance with FIG. 10 comprises a receptacle that comprises an element (carrying element, carrier) 340 and a foil/film 330, which are connected to one another by means of seams 380 such as adhesive seams or weld seams so that an internal space 310 is formed. The element 340 is dimensionally stable and supports the foil/film 330. The element 340 can be embodied by way of example as an end plate, housing, frame element, carrier frame or crash frame. The connection 390 is embodied in a boundary region of the element 340 and is closed by means of a closure or valve 395. The connection 390 is connected in a fluid conductive manner in the same boundary region to the internal space 310 so that an additional internal space having a constant volume (dead volume or dead space) in the element 340 in relation to the internal space 310 having a variable volume and consequently its influence during a pressure change is comparatively small. Consequently the relationship of the volume of the internal space 310 to the volume of the additional internal space determines an elastic constant of the clamping device 300. The receptacle can be embodied by way of example in a rectangular, such as square, or round shape.

The clamping device 300 in accordance with FIG. 11 corresponds essentially to the clamping device 300 illustrated in FIG. 10. The connection 390 is connected in a central region in a fluid conductive manner to the internal space 310 having a variable volume so that the additional internal space having a constant volume in the element 340 in relation to the internal space 310 having a variable volume and consequently its influence during a pressure change is greater in comparison to the clamping device 300 that is illustrated in FIG. 10.

Figure 12:
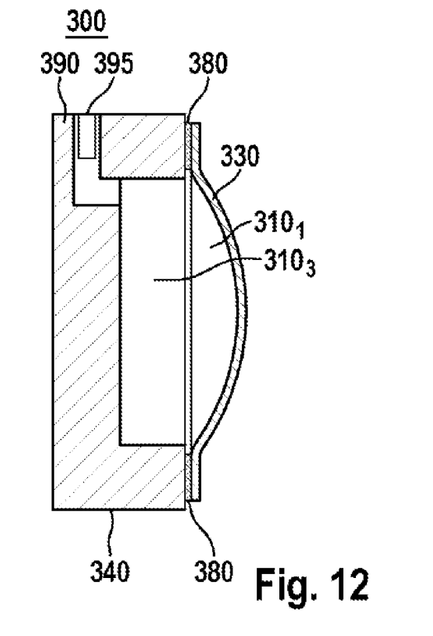

The clamping device 300 in accordance with FIG. 12 corresponds essentially to the clamping device 300 that is illustrated in FIG. 10. The element 340 comprises a further additional internal space $310_3$ having a constant volume that is connected in a fluid conductive manner to the connection 390 and the internal space $310_1$ so that the additional internal space having a constant volume in the element 340 in relation to the internal space $310_1$ having a variable volume and consequently its influence in the case of a change in pressure is essentially greater in comparison to the clamping device 300 that is illustrated in FIG. 10. It is possible by means of selecting a large dead volume to achieve a reduction in pressure as the gas is escaping.

Figure 13:
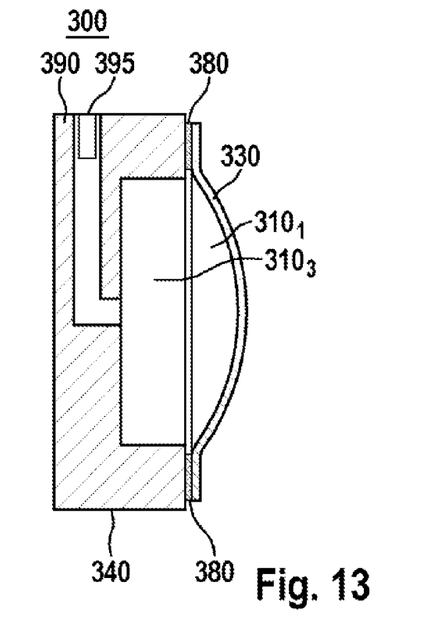

The clamping device 300 in accordance with FIG. 13 corresponds essentially to a combination of the clamping device 300 that is illustrated in FIG. 10 and the clamping device 300 that is illustrated in FIG. 12. The element 340 comprises the further additional internal space $310_3$ having a constant volume, and the connection 390 is connected in the central region in a fluid conductive manner to the additional internal space $310_3$ so that the additional internal space having a constant volume in the element 340 in relation to the internal space $310_1$ having a variable volume, and consequently its influence in the case of a change in pressure is even greater in comparison to the clamping device 300 that is illustrated in FIG. 10.

Figure 14:
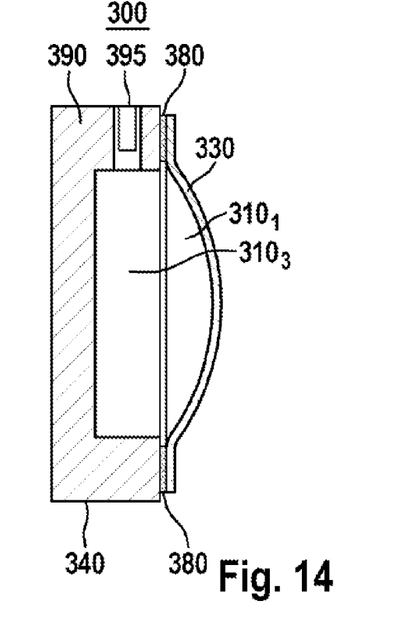

The clamping device 300 in accordance with FIG. 14 corresponds essentially to the clamping device 300 that is illustrated in FIG. 12. The connection 390 is connected in a fluid conductive manner at a peripheral surface of the further additional internal space $310_3$ to the further additional internal space $310_3$ so that the clamping device 300 can be embodied in a more compact manner in comparison to the clamping device 300 that is illustrated in FIG. 12.

Figure 15:
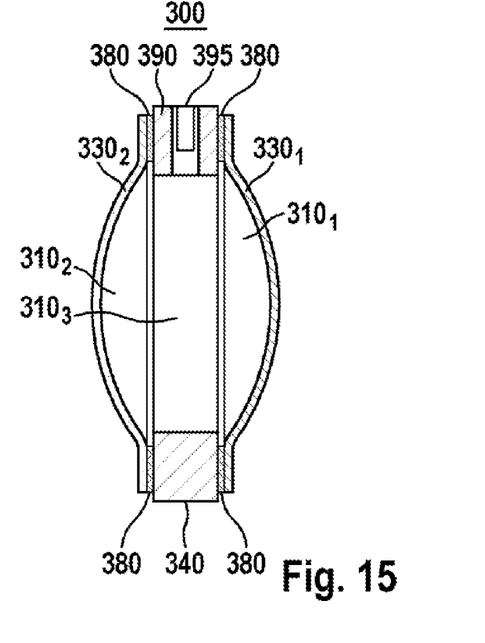

The clamping device 300 in accordance with FIG. 15 is similar to the clamping device 300 that is illustrated in FIG. 14. The clamping device 300 in accordance with FIG. 14 comprises a receptacle that comprises an element 340, a first foil/film $330_1$ and a second foil/film $330_2$ that are arranged opposite one another and/or are connected to the element 340 by means of seams 380 such as an adhesive seam or weld seams so that a first internal space $310_1$ having a first variable volume, a second internal space $310_2$ having a variable volume and a third internal space $310_3$ having a constant volume that are connected in a fluid conductive manner to one another are formed. The element 340 can be described as "communicating ducts". Whereas the first foil/film $330_1$ is used for clamping a first battery cell or a multiplicity of battery cells $100_3$, $100_4$, the second foil/film $330_2$ can be used by way of example, as described with regard to FIG. 4, for clamping a second battery cell or a multiplicity of battery cells $100_1$, $100_2$. Alternatively, the second foil/film $330_2$ can be used as a compensating element. In so doing, the relationship of the volume of the first internal space $310_1$ with respect to the total volume of the second internal space $330_2$ and the third internal space $330_3$ determines the elastic constants of this clamping device 300.

Figure 16:
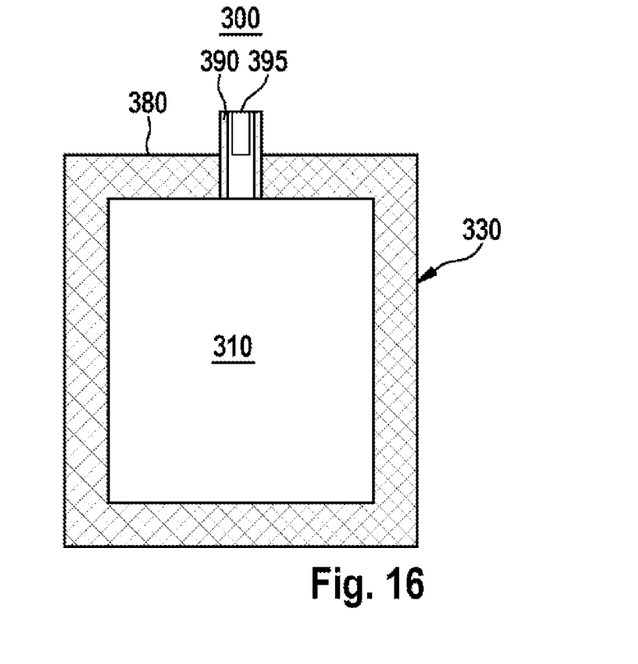
FIGS. 16-18 illustrate schematic longitudinal sectional views of clamping devices 300 in accordance with other embodiments of the invention.
Figure 17:
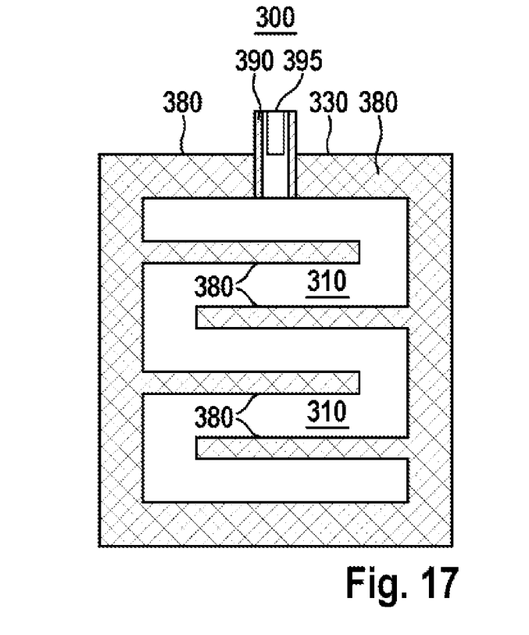
Figure 18:
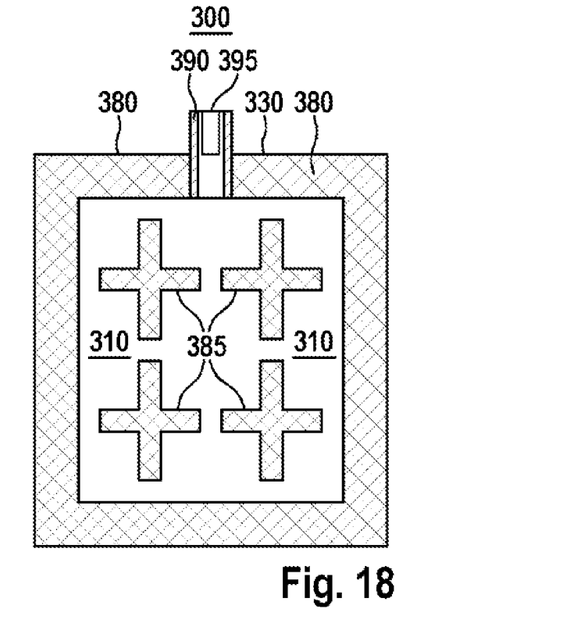

FIGS. 16-18 illustrate schematic longitudinal sectional views of clamping devices 300 in accordance with other embodiments of the invention.

The clamping device 300 in accordance with FIG. 16 corresponds essentially to the clamping device 300 that is illustrated in FIG. 8 and comprises the cushion-type receptacle. The foils/films 330 and the connection 390 are connected to one another in a boundary region by means of seams such as adhesive seams 380 or weld seams so that the internal space 310 is formed.

The clamping device 300 in accordance with FIG. 17 corresponds essentially to the clamping device 300 that is illustrated in FIG. 16. The clamping device 300 comprises furthermore a multiplicity of linear seams 385 such as adhesive seams or weld seams that connect the foils/films 330 to one another and are embodied in the internal space 310 in such a manner that the internal space 310 is structured or subdivided into a multiplicity of chambers that are connected to one another in a fluid conductive manner.

The clamping device 300 in accordance with FIG. 18 corresponds essentially to the clamping device 300 that is illustrated in FIG. 17. The clamping device 300 comprises furthermore a multiplicity of cross-shaped seams 385 such as adhesive seams or weld seams that connect the foils/films 330 to one another and are embodied in the internal space 310 in such a manner that the internal space 310 is structured or subdivided into a multiplicity of chambers that are connected to one another in a fluid conductive manner.

Alternatively, a clamping device can comprise a multiplicity of internal chambers or a multiplicity of chambers that are not connected to one another in a fluid conductive manner.

Figure 19:
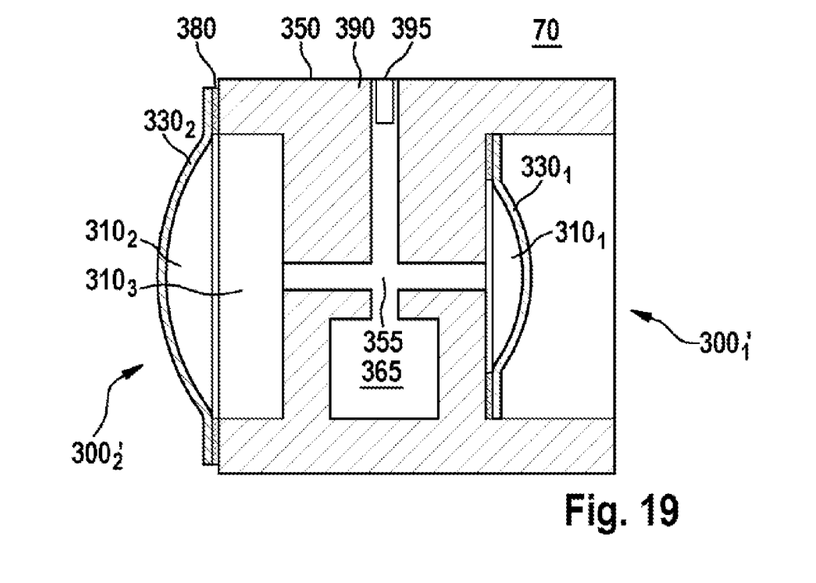
FIG. 19 illustrates a schematic sectional view of a clamping system 70 in accordance with another embodiment of the invention.

FIG. 19 illustrates a schematic sectional view of a clamping system 70 in accordance with another embodiment of the invention.

The clamping system 70 comprises a clamping element $300_2'$ having a dead volume $310_3$, which is similar to the clamping device 300 that is described with regard to FIG. 13, an element $300_1'$, which is similar to the clamping device 300 that is described with regard to FIG. 11, a chamber 365 for receiving a fluid volume and connecting ducts 355, which connect the clamping element $300_2'$, the element $300_1'$, the connection 390 and the chamber 365 to one another in a fluid conductive manner. The foil/film $330_1$ of the element $300_1'$ can be recessed, as illustrated in FIG. 19. The element $300_1'$ can be used as a clamping element for clamping battery cells or as an expansion element for storing a variable fluid volume without changing the external dimensions. The clamping system 70 can comprise a liquid as a working medium and, in the chamber 365, a gas as a pressure storage medium.

The system 70 can comprise a multiplicity of clamping elements and/or be installed by way of example in a crash frame.

Figure 20:
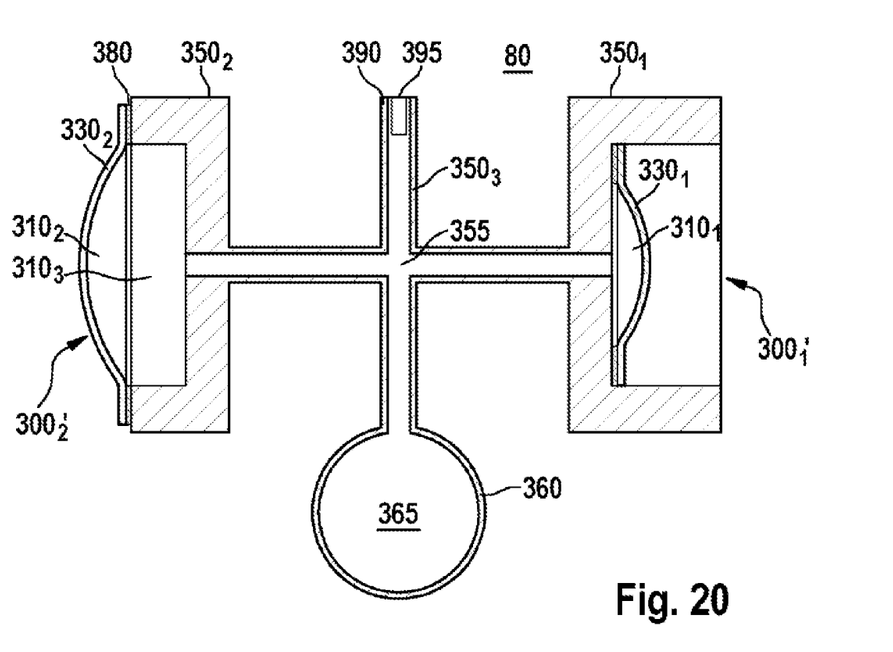
FIG. 20 illustrates a schematic sectional view of a modified clamping system 80 in accordance with this embodiment of the invention.

FIG. 20 illustrates a schematic sectional view of a modified clamping system 80 in accordance with this embodiment of the invention.

The modified clamping system 80 corresponds essentially to the clamping system 70 that is described with regard to FIG. 19. In contrast to the clamping system 70, the modified clamping system 80 comprises separate carrying elements $350_1$, $350_2$, a separate storage element 360 in which the chamber 365 is embodied, and/or separate communicating connection elements (ducts, hoses) $350_3$ so that a free, where necessary spatially separate, arrangement of the elements is rendered possible.

In conclusion, it is to be noted that expressions such as "including", "containing" and "comprising" or the like do not exclude that further elements or steps can be provided. The numbers used are merely an example so that a multiplicity can include 2, 4, 5, 6 or more elements or steps. Furthermore, reference is made to the fact that "a" or "one" do not exclude a multiplicity. Furthermore, it is to be noted that numbers in words or ordinal numbers such as "first", "second" etc. are used exclusively to differentiate between elements and steps without specifying or limiting a chronological order of the arrangement of the elements or of the performance of the steps. Moreover, the features that are described in conjunction with the different embodiments can be combined in an arbitrary manner with one another. Finally, it is to be noted that the reference numerals in the claims are not be regarded as limiting the protective scope of the claims.

The invention claimed is:

1. A battery module comprising:
   a housing having opposed walls;
   at least two battery cells arranged between the opposed walls of the housing; and
   a clamping device (300) for compressing the plurality of battery cells (100), the entirety of the clamping device being positioned between the opposed walls of the housing; and the clamping device and the at least two battery cells arranged in a row between the opposed walls such that each of the at least two battery cells is compressed between the clamping device and one of the opposed walls, wherein the clamping device comprises a closed receptacle that comprises a space (310) with a variable volume containing a fluid such that the receptacle compresses the battery cells, and wherein the clamping device comprises a carrier element having an internal cavity that has a constant volume, that has an opening on one side and that forms a first part of the space with the variable volume, and wherein a flexible membrane covers the opening and is bowed away from the opening when the clamping device is in an uncompressed state so that the flexible membrane defines an internal space that forms a second part of the space with the variable volume.

2. The battery module as claimed in claim 1, wherein;
   the receptacle contains the fluid, or
   the fluid comprises a liquid, water, silicone oil, gas, inert gas, nitrogen, noble gas, argon, krypton or gel,
   the fluid is compressible, or
   the fluid is non-compressible.

3. A battery system, comprising:
   the battery module as claimed in claim 1.

4. A vehicle, comprising:
   the battery module as claimed in claim 1.

5. The battery module as claimed in claim 1, wherein the flexible membrane (320) comprises a foil/film (330), a synthetic material film, a metallized film or a metal foil or fabric.

6. The battery module as claimed in claim 1, wherein the flexible membrane is embodied in an electrically conductive manner.

7. The battery module as claimed in claim 1, wherein the flexible membrane comprises an electrically conductive material, aluminum, copper or carbon.

8. The battery module as claimed in claim 1, wherein the flexible membrane is embodied in an electrically non-conductive manner.

9. The battery module as claimed in claim 1, wherein the carrier element comprises a metal, aluminum or a synthetic material.

10. The battery module as claimed in claim 1, wherein the carrier element is an end plate (210').

11. The battery module as claimed in claim 1, wherein the receptacle comprises a closure (395), a valve, a safety valve or an excess pressure valve.

12. The battery module as claimed in claim 1, wherein the receptacle comprises a seam, adhesive seam or weld seam.

13. The battery module as claimed in claim 1, wherein both of the at least two battery cells are compressed between the clamping device and one of the opposed walls.

14. The battery module as claimed in claim 13, wherein the at least two battery cells includes a third battery cell, wherein the third battery cell is compressed between the clamping device and the other of the opposed walls.

15. The battery module as claimed in claim 1, wherein the battery cells are prismatic battery cells.

16. A method for producing a battery module (20; 30; 40; 50; 60), comprising:
providing a housing having opposed walls,
providing at least two battery cells,
providing a clamping device for compressing the battery cells, the clamping device comprising a receptacle that comprises a space (310) having a variable volume for receiving a fluid and a carrier element having an internal cavity that has a constant volume, that has an opening on one side and that forms a first part of the space with the variable volume, and wherein a flexible membrane covers the opening and is bowed away from the opening when the clamping device is in an uncompressed state so that the flexible membrane defines an internal space that forms a second part of the space with the variable volume,
arranging the entirety of the clamping device (300) and the at least two battery cells (100) in a row in the housing between the opposed walls,
after arranging the clamping device and the at least two battery cells in the housing, filling the space of the clamping device (300) with the fluid, thereby compressing each of the at least two battery cells between the clamping device and one of the opposed walls, and
thereafter closing the space of the clamping device.

17. The method as claimed in claim 16, wherein:
the procedure of filling the space of the clamping device (300) includes closing the receptacle.

18. The method as claimed in claim 17, furthermore comprising:
closing the receptacle, and
cooling or liquefying the fluid,
wherein:
the procedure of filling the space of the clamping device (300) includes:
warming the fluid in the receptacle or allowing the re-warming of the fluid in the receptacle.

19. The method as claimed in claim 16, furthermore comprising:
checking a pressure of the fluid in the receptacle, or
adjusting the pressure.

20. A battery module comprising:
a housing having opposed walls;
at least two battery cells arranged between the opposed walls of the housing; and
a clamping device (300) for compressing the plurality of battery cells (100), the clamping device and the at least two battery cells arranged in a row between the opposed walls such that each of the at least two battery cells is compressed between the clamping device and one of the opposed walls, wherein the clamping device comprises a closed receptacle defining a space (310) having a variable volume containing a fluid such that the receptacle compresses the battery cells, and wherein the space is subdivided into a multiplicity of chambers, wherein the clamping device comprises a carrier element having an internal cavity that has a constant volume, that has an opening on one side and that forms a first part of the space with the variable volume, and wherein a flexible membrane covers the opening and is bowed away from the opening when the clamping device is in an uncompressed state so that the flexible membrane defines an internal space that forms a second part of the space with the variable volume.

* * * * *